US007144004B1

(12) United States Patent
Conversa

(10) Patent No.: US 7,144,004 B1
(45) **Date of Patent: *Dec. 5, 2006**

(54) CLAMP JAW FOR RESTRICTED SPACES

(75) Inventor: Carl Converesa, Guerneville, CA (US)

(73) Assignee: Adjustable Clamp Co., Chicago, IL (US)

( * ) Notice: Subject to any disclaimer, the term of this patent is extended or adjusted under 35 U.S.C. 154(b) by 0 days.

This patent is subject to a terminal disclaimer.

(21) Appl. No.: 11/215,154

(22) Filed: Aug. 30, 2005

Related U.S. Application Data

(63) Continuation of application No. 10/899,237, filed on Jul. 26, 2004, now Pat. No. 6,935,628.

(51) Int. Cl.
*B23Q 1/00* (2006.01)

(52) U.S. Cl. .......................... 269/47; 269/147; 269/166

(58) Field of Classification Search .................. 269/47, 269/147, 166–171, 257, 197–199, 269, 259, 269/270
See application file for complete search history.

(56) References Cited

U.S. PATENT DOCUMENTS

| | | | | |
|---|---|---|---|---|
| 1,045,974 | A | | 12/1912 | Haines |
| 2,221,325 | A | | 11/1940 | Holman |
| 2,579,151 | A | | 12/1951 | Lloyd |
| 4,564,182 | A | * | 1/1986 | Svajgl ........................ 269/102 |
| 4,600,183 | A | | 7/1986 | Ogden |
| 4,631,882 | A | | 12/1986 | Sease |
| 5,098,066 | A | | 3/1992 | Willcox |
| 5,139,231 | A | | 8/1992 | Temple |
| 5,190,266 | A | | 3/1993 | Barrera |
| 5,231,739 | A | | 8/1993 | Mattesky |
| 5,297,339 | A | | 3/1994 | Morgenstern et al. |
| 5,348,274 | A | | 9/1994 | Breen |
| 5,355,649 | A | | 10/1994 | Berridge |
| 5,370,377 | A | | 12/1994 | Van Der Meer |
| 5,379,987 | A | * | 1/1995 | Cleary ........................ 254/134 |
| 5,388,813 | A | | 2/1995 | Arsenault |
| 5,617,690 | A | | 4/1997 | Gibbs |
| 5,622,020 | A | | 4/1997 | Wood |
| 5,644,885 | A | | 7/1997 | Eischeid |
| 5,689,864 | A | | 11/1997 | White |
| 5,706,621 | A | | 1/1998 | Pervan |
| 5,800,089 | A | | 9/1998 | Donaton |
| 5,860,267 | A | | 1/1999 | Pervan |
| 5,875,535 | A | * | 3/1999 | Canoy ......................... 29/275 |
| 5,894,705 | A | | 4/1999 | Sutton |
| 5,979,887 | A | | 11/1999 | Hassman |
| 5,983,573 | A | | 11/1999 | MacKarvich |
| 6,023,907 | A | | 2/2000 | Pervan |
| 6,027,279 | A | | 2/2000 | Skjaeveland |
| 6,039,313 | A | | 3/2000 | Baculy |
| 6,182,410 | B1 | | 2/2001 | Pervan |
| 6,252,151 | B1 | | 6/2001 | Liao |
| 6,289,645 | B1 | | 9/2001 | Schmid |

(Continued)

*Primary Examiner*—Lee D. Wilson
(74) *Attorney, Agent, or Firm*—Cook, Alex, McFarron, Manzo, Cummings & Mehler, Ltd.

(57) ABSTRACT

A clamp jaw for restricted spaces is comprised of a base plate with a clamp engaging plate projecting from a side of the base plate at a right angle, and a gripping plate projecting from an opposite side of the base plate at a right angle. A though hole is positioned in the clamp engaging plate for receiving a shaft of a clamp. The gripping plate is arranged for gripping an article to be clamped, such as a deck board. The gripping plate has a thickness which is no greater than the desired gap between adjacent articles to be clamped, such as the gap between adjacent boards.

1 Claim, 1 Drawing Sheet

U.S. PATENT DOCUMENTS

| | | | | |
|---|---|---|---|---|
| 6,324,803 | B1 | 12/2001 | Pervan | |
| 6,402,131 | B1 | 6/2002 | Baculy | |
| 6,460,306 | B1 | 10/2002 | Nelson | |
| 6,516,579 | B1 | 2/2003 | Pervan | |
| 6,539,641 | B1 | 4/2003 | Belliveau | |
| D474,955 | S * | 5/2003 | Sauders | D8/101 |
| 6,641,126 | B1 * | 11/2003 | Yang | 269/282 |
| 6,702,270 | B1 | 3/2004 | Reschke | |
| 6,769,217 | B1 | 8/2004 | Nelson | |
| 6,877,731 | B1 | 4/2005 | Corley, Sr. | |
| 6,935,628 | B1 * | 8/2005 | Conversa | 269/147 |
| 2002/0046527 | A1 | 4/2002 | Nelson | |
| 2002/0069545 | A1 | 6/2002 | Belliveau | |
| 2002/0112432 | A1 | 8/2002 | Spivey | |
| 2003/0074855 | A1 | 4/2003 | Nelson | |
| 2003/0077118 | A1 | 4/2003 | Kobusch et al. | |
| 2003/0182886 | A1 | 10/2003 | Parrish | |
| 2005/0039413 | A1 | 2/2005 | Schrotenboer | |
| 2005/0141956 | A1 | 6/2005 | Leon et al. | |

* cited by examiner

CLAMP JAW FOR RESTRICTED SPACES

CROSS-REFERENCE TO RELATED APPLICATIONS

This is a continuation of U.S. application Ser. No. 10/899,237 filed on Jul. 26, 2004.

BACKGROUND OF THE INVENTION

1. Field of the Invention

The invention broadly relates to clamps.

2. Prior Art

An exterior deck of a residential or commercial building is comprised of parallel boards fastened on top of transverse joists. The boards are spaced from each other or gapped for drainage. The gaps are about the diameter of a size 20 nail. Although there are adjustable jaw clamps available, such as the one disclosed in U.S. Pat. No. 2,221,325 to Holman, such clamps have jaws which cannot fit in the small gap between deck boards.

BRIEF SUMMARY OF THE INVENTION

A clamp jaw for restricted spaces is comprised of a base plate with a clamp engaging plate projecting from a side of the base plate at a right angle, and a gripping plate projecting from an opposite side of the base plate at a right angle. A through hole is positioned in the clamp engaging plate for receiving a shaft of a clamp. The gripping plate is arranged for gripping an article to be clamped, such as a deck board. The gripping plate has a thickness which is no greater than the desired gap between adjacent articles to be clamped, such as the gap between adjacent boards.

Figure 1:
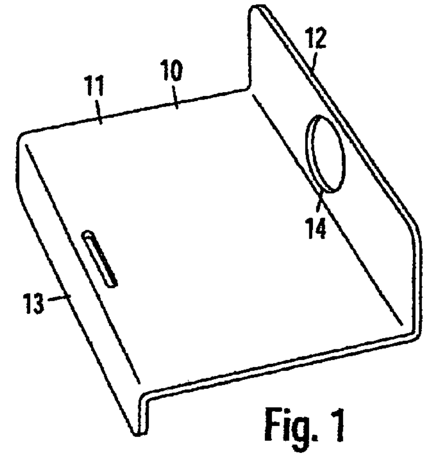
FIG. 1 is a perspective view of a clamp jaw.

| DRAWING REFERENCE NUMERALS | |
|---|---|
| 10. Clamp Jaw | 11. Base Plate |
| 12. Clamp Engaging Plate | 13. Gripping Plate |
| 14. Through Hole | 20. Clamp |
| 21. Locking Keys | 22. First Jaw |
| 23. Shaft | 24. Second Jaw |
| 25. Crank | 30. Deck Board |
| 31. Gap | 32. Deck Board |
| 33. Deck Board | |

DETAILED DESCRIPTION OF THE INVENTION

FIGS. 1–2

Figure 2:
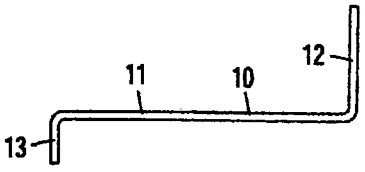
FIG. 2 is a side view thereof.

A preferred embodiment of a clamp jaw 10 for restricted spaces is shown in a perspective view in FIG. 1 and a side view in FIG. 2. Clamp jaw 10 is comprised of a base plate 11 with a clamp engaging plate 12 projecting from a side of base plate 11 generally at a right angle, and a gripping plate 13 projecting from an opposite side of base plate 11 generally at a right angle. Clamp engaging plate 12 and gripping plate 13 are offset relative to each other along base plate 11. A through hole 14 is positioned in clamp engaging plate 12 for receiving a shaft of a clamp. Gripping plate 13 is arranged for gripping an article to be clamped, such as a deck board. Gripping plate 13 is preferably no more than about 3 mm thick, which is no greater than the desired space between adjacent articles to be clamped, such as the gap between adjacent deck boards.

FIG. 3

Figure 3:
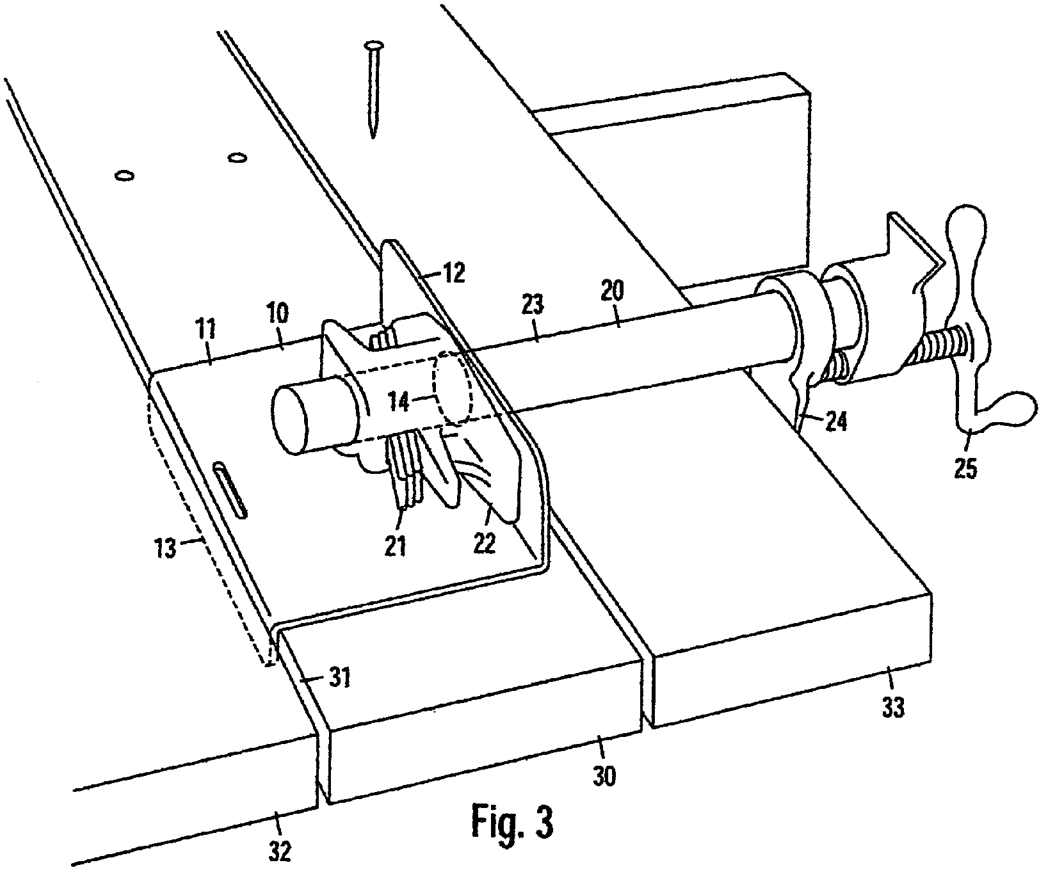
FIG. 3 shows the clamp bracket in use.

Clamp jaw 10 is shown in use in FIG. 3. Clamp engaging plate 12 is attached to a clamp 20 by depressing locking keys 21 on a first jaw 22 of clamp 20 and sliding jaw 22 off a shaft 23. Shaft 23 is positioned through hole 14 on clamp engaging plate 12 and first jaw 22 is replaced onto shaft 23. Clamp jaw 10 thus becomes an extension of first jaw 22 but gripping plate 13 is thin enough to be positioned in restricted spaces.

In this example, base plate 11 is positioned flat on top of an installed deck board 30, so that gripping plate 13 is angled down into a gap 31 between deck board 30 and an adjacent installed deck board 32, and clamp engaging plate 12 is angled up from deck board 30. Gripping plate 13 is thin enough to be positioned in gap 31 between installed deck boards 30 and 32. A second jaw 24 of clamp 20 is positioned against an outer side of a deck board 33 being installed. A crank 25 on clamp 20 is rotated to move second jaw 24 towards first jaw 22 and position deck board 33 adjacent deck board 30. Any bowing in deck board 33 may be corrected by applying enough pressure with clamp 20 to straighten deck board 33.

Although the foregoing description is specific, it should not be considered as a limitation on the scope of the invention, but only as an example of the preferred embodiment. Many variations are possible within the teachings of the invention. For example, clamp jaw may be used with other clamps. Therefore, the scope of the invention should be determined by the appended claims and their legal equivalents, not by the examples given.

I claim:

1. A clamping device comprising:

a clamp comprising a shaft and first and second jaws mounted to the shaft, at least one of the first and second jaws being movable along the shaft; and a clamp jaw comprising a base plate parallel and adjacent to the shaft of the clamp, a clamp engaging plate projecting from a side of the base plate for engaging an inner side of one of the first and second jaws of the clamp, a through hole in the clamp engaging plate for receiving the shaft of the clamp, and a gripping plate projecting from an opposite side of the base plate for gripping an article to be clamped between the gripping plate and the other of the first and second jaws of the clamp, wherein the clamp engaging plate and the gripping plate are offset relative to each other along the base plate.

* * * * *